(12) United States Patent
Pittl et al.

(10) Patent No.: US 8,074,848 B2
(45) Date of Patent: Dec. 13, 2011

(54) VALVE ARRANGEMENT FOR A PRESSURISED FLUID CONTAINER

(75) Inventors: Oskar Pittl, Neuengors (DE); Michael Horn, Oldenburg (DE)

(73) Assignee: Lindal Dispenser GmbH, Schonberg (DE)

(*) Notice: Subject to any disclaimer, the term of this patent is extended or adjusted under 35 U.S.C. 154(b) by 318 days.

(21) Appl. No.: 12/423,125

(22) Filed: Apr. 14, 2009

(65) Prior Publication Data

US 2009/0261130 A1    Oct. 22, 2009

(30) Foreign Application Priority Data

Apr. 17, 2008  (DE) .................. 10 2008 019 224

(51) Int. Cl.
*B65D 83/44* (2006.01)
*B65D 83/16* (2006.01)
*B65D 83/14* (2006.01)
*B65D 83/00* (2006.01)

(52) U.S. Cl. ................. 222/402.24; 222/402.1

(58) Field of Classification Search ........... 222/402.1, 222/402.24, 402.25; 239/337
See application file for complete search history.

(56) References Cited

U.S. PATENT DOCUMENTS

| 3,180,374 | A |   | 4/1965  | Muller et al. |
| 5,014,887 | A | * | 5/1991  | Kopp .................. 222/402.1 |
| 5,762,319 | A | * | 6/1998  | Kopp .................. 251/149.6 |
| 6,058,960 | A |   | 5/2000  | Kopp |
| 6,817,494 | B2|   | 11/2004 | Lilenthal |
| 7,261,225 | B2| * | 8/2007  | Rueschhoff et al. ..... 222/402.25 |

FOREIGN PATENT DOCUMENTS

EP        2028131 A2    2/2009

* cited by examiner

*Primary Examiner* — Darren W Gorman
(74) *Attorney, Agent, or Firm* — Vidas, Arrett & Steinkraus, P.A.

(57) ABSTRACT

Valve arrangement for a pressurized fluid container, consisting of a valve disc which may be sealingly connected to the fluid container, a valve body made of plastics which may be secured in an opening of the valve disc, a valve piston made of plastics which is guided in a through-channel of the valve body and cooperates with a sealing surface of the valve body and a spring arrangement cooperating with the valve body, which presses the valve piston against the sealing surface of the valve body, the valve body comprising a neck defining the through-channel and at least one collar segment, an annular groove being formed between the neck and the at least one collar segment, and into the annular groove a press ring being introduced, of which the thickness in the radial direction is such that the at least one collar segment is pressed in a spread-apart manner against the opening of the valve disc.

13 Claims, 2 Drawing Sheets

VALVE ARRANGEMENT FOR A PRESSURISED FLUID CONTAINER

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention relates to a valve arrangement for a pressurized fluid container for discharging foam and other media.

Valve arrangements for pressurized fluid containers, for example aerosol containers or the like, but also pressurized containers for more viscous media, such as gels or foams are also known in different embodiments.

In valve arrangements for fluid containers, a differentiation is made between spring-actuated valve pistons or closure members and so-called tilt valves. The valve arrangement according to the invention refers to spring-actuated valves.

It is known to arrange between the valve piston and valve body a helical spring, which pretensions the valve piston against a sealing surface or a valve seat. A valve arrangement has become known from DE 197 10 541, the entire contents of which is incorporated herein by reference, in which the valve piston is pretensioned upwards by a spring tongue against a sealing seat. The spring tongue is part of a clip which is attached to the valve body. The valve body consists of plastics, whilst the clip is formed from spring metal.

A valve arrangement is known from EP 1 300 617, the entire contents of which is incorporated herein by reference comprising a valve disc, a valve body attached in an opening of the valve disc, a valve piston guided in a through-channel of the valve body, and a valve cap. A portion of the base of the cap and a lower portion of the piston cooperate in a telescopic manner such that, due to the elastic deformation, a spring force is produced on the piston which presses the piston against a sealing surface of the valve body.

In the known valve arrangements, an annular groove of the valve body engages in an internal portion of the opening of the valve disc. In this connection, however, when filling the container with propellant the valve body may be ejected inwards by high filling pressure. The connection of the valve body to the valve disc may loosen when subjected to greater loads.

BRIEF SUMMARY OF THE INVENTION

The object of the invention is to provide a valve arrangement for a pressurized fluid container, which is entirely made up of parts which are easy to manufacture and plastics parts which are made of inexpensive material and holds the valve body more rigidly and more securely in the valve disc.

In the arrangement according to the invention, according to the preamble of claim 1, the valve body comprises a neck defining the through-channel and at least one collar segment. An open annular groove facing away from the fluid container is formed between the neck and the at least one collar segment. Into the annular groove a press ring is introduced, of which the thickness in the radial direction is such that the at least one collar segment is pressed in a spread-apart manner against the opening of the valve disc.

The valve body consisting of plastics is inserted into the opening of the valve disc, the at least one collar segment being pressed against the edge of the disc portion forming the opening. A press ring is inserted into the annular groove between the neck and the at least one collar segment of the valve body. The press ring is dimensioned so that the at least one collar segment is radially forced away from the neck and pressed against the opening of the valve disc. This embodiment has the advantage that the valve body is connected to the valve disc in a more stable and more secure manner and, even in the event of high pressure in the axial direction, such as for example when filling the container, is not ejected inwards into the container.

In a preferred embodiment, the opening of the valve disc is defined by a bent-back disc portion. In this case, the disc in the region of the opening is radially bent back, facing away from the container, whereby the stability of the connection between the valve disc and the at least one collar segment is increased.

Preferably, the bent-back disc portion is clamped under a shoulder of the at least one collar segment. As a result, the stability is even further increased axially in the direction of the container.

In a preferred embodiment, the valve disc has a peripheral disc base and bears flat against the valve body in a transition region between the base and bent-back disc portion. As a result, in addition to the seal of the valve body, the protection of the valve body is also improved against forces oriented axially away from the container, as produced, for example, by possible excess pressure in the container.

Preferably, the base of the valve disc bears flat against the valve body. As a result, both the seal and the protection of the valve body is further improved against forces oriented axially away from the container.

In a preferred embodiment, the valve body has peripheral sealing projections which bear against the valve disc in the transition region between the disc portion and the base. The sealing projections may also bear against the base. Between the sealing projections and the valve disc a certain tension may be created via the sealing projections, which increases the sealing effect in this region.

In a preferred embodiment, the spring arrangement is connected to the valve body and has at least one spring portion. The at least one spring portion cooperates with the valve piston such that it pretensions the valve piston in its sealed position against the sealing surface. The pretensioning produces a restoring force in the direction of the sealing surface for the valve piston. This restoring force is further increased by the pressure in the fluid container. The disclosed restoring spring action may be designed such that the valve piston bears against the sealing surface. The closing force for sealing may thus be substantially applied by the internal pressure in the fluid container. The at least one spring portion is dimensioned such that sufficient capacity is provided for the through-passage of the medium.

Expediently, the spring arrangement has three spring portions.

In a preferred embodiment, the valve piston has on its periphery at least one sealing lip which is arranged such that it sealingly cooperates with the sealing surface of the valve body. Between the sealing lip and the sealing surface of the valve body, a tension may be created via the sealing lip which increases the sealing action in this region.

In a preferred embodiment, the spring arrangement comprises an annular portion which snaps into an annular portion of the valve body with a projection oriented radially outwards. The position of the spring arrangement is thus secured against radial displacement. The snap-in cooperation of the projection with the valve body also has the result that, in the event of high pressure exerted on the at least one spring portion, the spring arrangement is not able to fall into the container.

Preferably, the annular portion of the spring arrangement bears at its free end against a radial portion of the valve body, whereby the stability of the arrangement is increased.

In a preferred embodiment, at least one peripheral toothing is arranged externally at the end of the neck of the valve body facing away from the container. As a result, the seal of a tubular portion of a discharge head is increased, which may be positioned onto the neck for discharging the medium.

BRIEF DESCRIPTION OF THE SEVERAL VIEWS OF THE DRAWINGS

A preferred embodiment of the valve arrangement according to the invention is explained in more detail with reference to the following figures, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
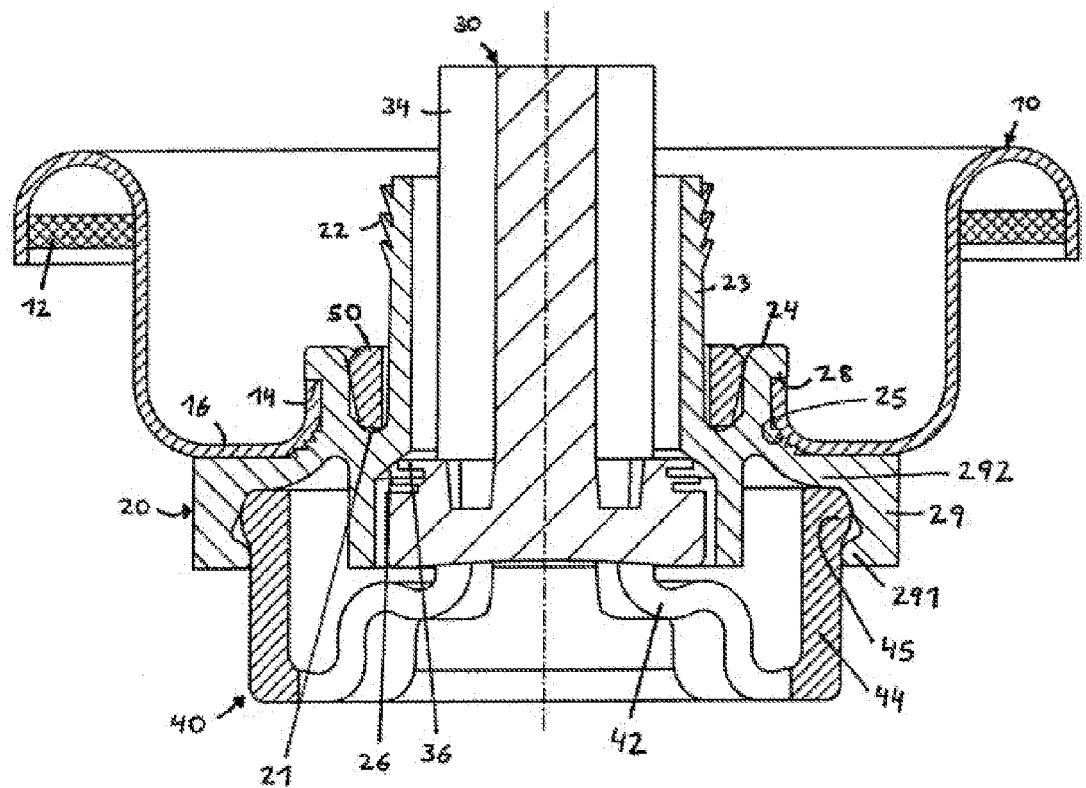
FIG. 1 shows in section a valve arrangement according to the invention
Figure 2:
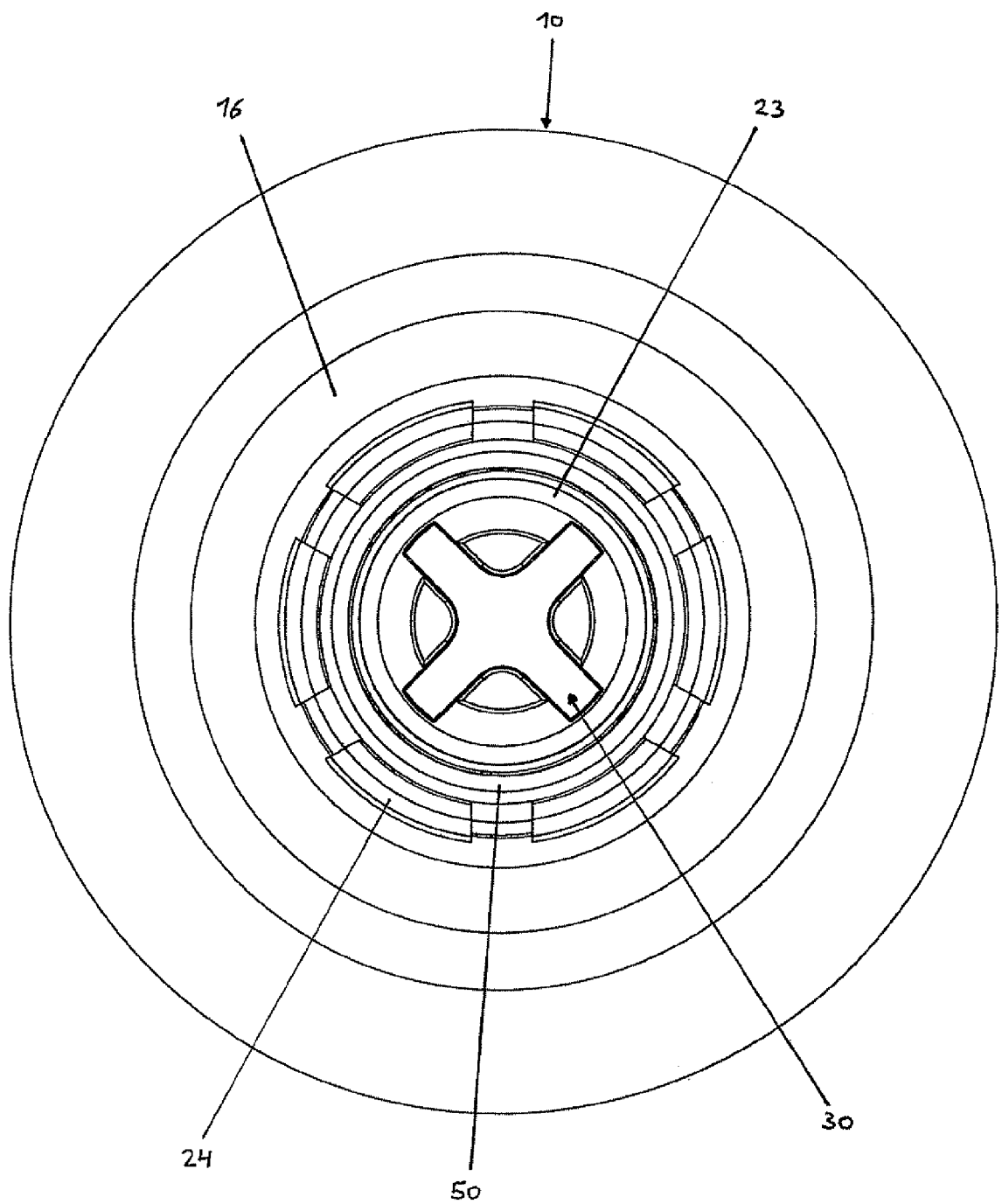
FIG. 2 shows the plan view of the valve arrangement according to FIG. 1.

The valve arrangement shown in FIG. 1 for a fluid container comprises a valve disc 10 which is attached via an external seal 12 to a fluid container, not shown. A valve body 20 made of plastics material is located in an opening of the valve disc 10. The valve body 20 receives a valve piston 30 in a through-opening. Moreover, a spring arrangement 40 is fastened to the valve body 20. A press ring 50 is configured as a separate component and arranged on the side on the valve body remote from the fluid container. The individual parts of the valve arrangement are explained below according to FIG. 1.

The valve body 20 has a neck 23 which defines the through-opening. At the free end of the neck 23 a peripheral toothing 22 is arranged on its external wall, which has blades inclined towards the discharge opening. The other fixed end of the neck 23 opens into an annular groove 21 which is formed between the fixed end of the neck 23 and peripheral, spaced-apart collar segments 24 of the valve body 20. The collar segments 24 respectively have a shoulder 28 which engages over a bent-back portion 14 of the valve disc. The press ring 50 is inserted into the annular groove 21, which presses the collar segments radially outwards against the bent-back portion 14 of the valve disc 10.

The valve disc 10 has a peripheral base 16 which merges with the bent-back portion 14 towards the opening. The valve body bears against the base 16 of the valve disc 10 and the bent-back portion 14 as far as under the shoulders 28 of the collar segments 24. In the transition region between the base 16 and the bent-back portion 14 the valve body 20 has sealing projections 25 which bear sealingly against the valve disc 10. By the structural design of the shoulders 28 and the sealing projections 25, a sealed and secure cooperation between the valve body 20 and the valve disc 10 is provided.

The shaft 34 of the valve piston 30 is guided in the through-opening against the inner wall of the neck 23, and has a cross section which allows secure guiding and at the same time provides the possibility for the through-passage of the dispensed medium. The cross section may be star-shaped or as shown in the figure, cross-shaped.

In the transition region to the neck 23, the through-opening of the valve body 20 is conically tapered. This tapering portion forms the peripheral sealing surface 26. The valve piston 30 has a greater diameter on the side facing the container. In the transition to the shaft 34, the valve piston 30 is configured according to the sealing surface 26, so that it bears sealingly thereagainst. Along its periphery the valve piston 30 has sealing lips 36 which sealingly cooperate with the sealing surface 26.

The spring arrangement 40 comprises spring portions 42 and an annular portion 44. The annular portion 44 has a projection 45 which is formed as a thickening on the radially outwardly facing edge of the annular portion 44. The valve body 20 has an annular portion 29 with a projection 291 which is formed as a thickening on the edge of the annular portion 29 facing radially inwards. During mounting, the spring arrangement 40 is pressed from below against the valve body 20, the projections 45 and 291 sliding over one another and being snapped in, in order to secure the spring arrangement 40 effectively on the valve body 20. The free end of the annular portion 44 comes to bear, therefore, against a radially extending portion 292 of the valve body 20, so that the spring arrangement 40 is held both radially and axially secured on the valve body 20.

In the mounted state, the spring portions 42 are already pretensioned and bring the valve piston 30 sealingly into engagement with the sealing surface 26 of the valve body 20. If the valve piston 30 is moved by pressure into the container, the spring portions 42 are spread apart further and increase the spring force, so that a sufficient restoring force is created which returns the valve piston 30 when the force drops. The spring portions 42 also prevent, however, the valve body 30 from being pushed too deeply into the container, whereby the valve piston 30 could become skewed and as a result no longer close the valve.

The invention claimed is:

1. A valve arrangement for a pressurised fluid container, comprising
   a valve disc (10) which may be sealingly connected to a fluid container,
   a valve body (20) made of plastics which may be secured in an opening of the valve disc (10),
   a valve piston (30) made of plastics which is guided in a through-channel of the valve body (20) and cooperates with a sealing surface (26) of the valve body and
   a spring arrangement (40) cooperating with the valve body (20), which presses the valve piston (30) against the sealing surface (26) of the valve body (20),
characterised in that the valve body (20) comprises a neck (23) defining the through-channel and at least one collar segment (24), an annular groove (21) being formed between the neck (23) and the at least one collar segment (24), and into the annular groove (21) a press ring (50) is introduced, of which the thickness in the radial direction is such that the at least one collar segment (24) is pressed in a spread-apart manner against the opening of the valve disc (10).

2. The valve arrangement according to claim 1, characterised in that the opening of the valve disc (10) is defined by a bent-back disc portion (14).

3. The valve arrangement according to claim 2, characterised in that the bent-back disc portion (14) is clamped under a shoulder (28) of the at least one collar segment (24).

4. The valve arrangement according to claim 2, characterised in that the valve disc (10) has a peripheral base (16) and bears flat against the valve body (20) in a transition region between the base and the bent-back disc portion (14).

5. The valve arrangement according to claim 1, characterised in that said valve disc includes a base (16) and the base (16) of the valve disc (10) bears flat against the valve body (20).

6. The valve arrangement according to claim 4, characterised in that the valve body (20) has peripheral sealing projections (25), which bear against the valve disc (10) in the transition region between the disc portion (14) and the base (16) or against the base (16).

7. The valve arrangement according to claim 4, characterised in that the valve body (20) comprises peripheral sealing projections (25), which bear against the valve disc (10) in the transition region between the disc portion (14) and the base (16) and against the base (16).

8. The valve arrangement according to claim 1, characterised in that said spring arrangement (40) is connected to the valve body (20), and at least one spring portion (42) of the spring arrangement (40) and the valve piston (30) cooperate, the at least one spring portion (42) pretensioning the valve piston (30) in its sealing position against the sealing surface (26).

9. The valve arrangement according to claim 8, characterised in that three spring portions (42) are provided.

10. The valve arrangement according to claim 1, characterised in that the valve piston (30) has on its periphery at least one sealing lip (36) which is arranged such that it sealingly cooperates with the sealing surface (26) of the valve body (20).

11. The valve arrangement according to claim 1, characterised in that the spring arrangement (40) comprises an annular portion (44), which snaps into an annular portion (29) of the valve body (20) with a projection (45) oriented radially outwards.

12. The valve arrangement according to claim 11, characterised in that said annular portion (44) includes a free end and the annular portion (44) of the spring arrangement (40) bears at its free end against a radial portion (292) of the valve body (20).

13. The valve arrangement according to claim 1, characterised in that at least one peripheral toothing (22) is arranged externally at the end of the neck (23) of the valve body (20) facing away from the container.

\* \* \* \* \*